April 15, 1930.  E. E. SLICK  1,754,912

CONTINUOUS GLASS MELTING POT

Filed Sept. 2, 1926   3 Sheets-Sheet 1

INVENTOR
Edwin E. Slick
by his attorneys
Byrnes, Stebbins & Parmelee

April 15, 1930.　　　　E. E. SLICK　　　　1,754,912
CONTINUOUS GLASS MELTING POT
Filed Sept. 2, 1926　　　3 Sheets-Sheet 2

INVENTOR
Edwin E. Slick
by his attorneys
Byrnes, Stebbins & Parmelee

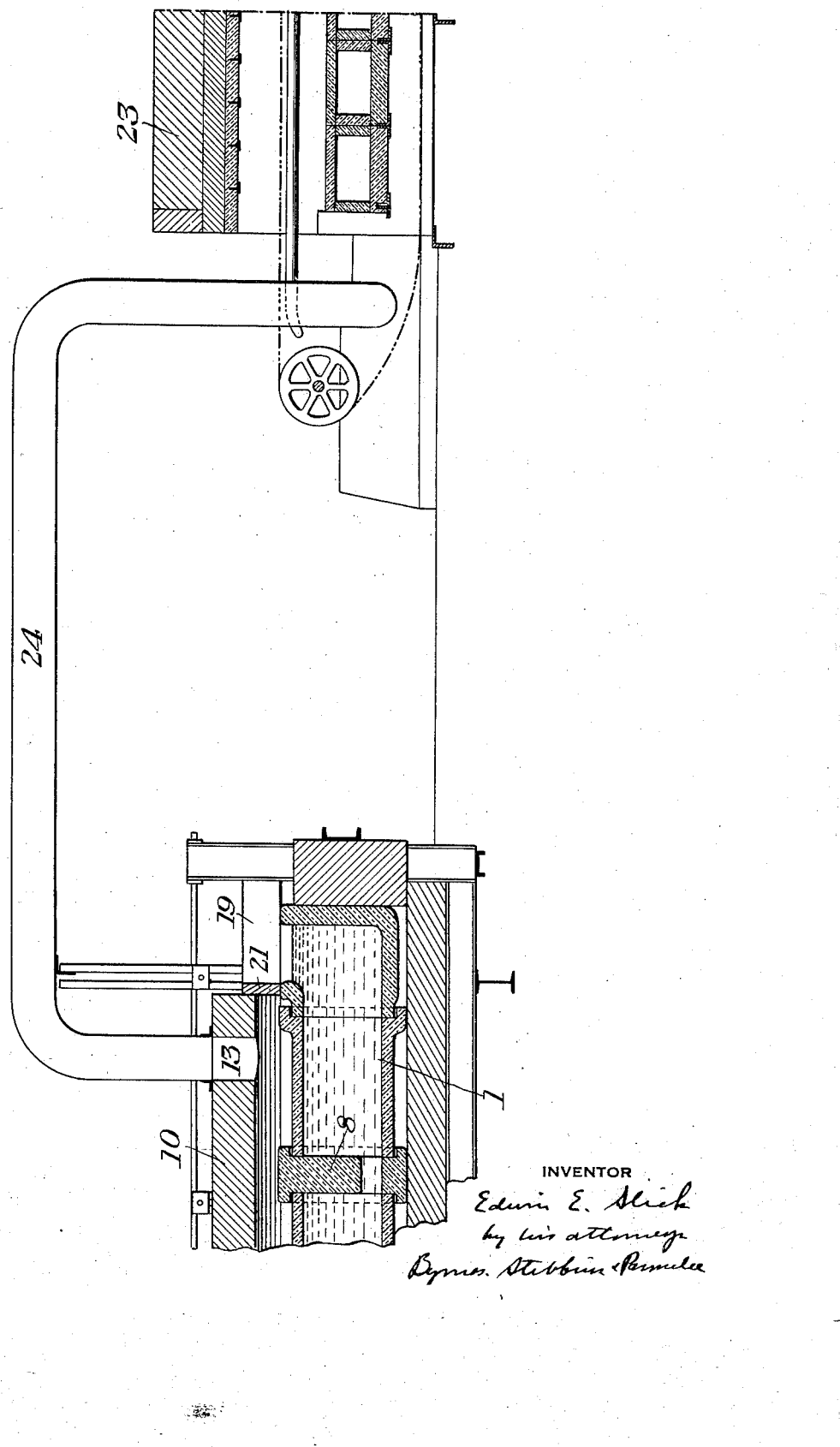

Patented Apr. 15, 1930

1,754,912

UNITED STATES PATENT OFFICE

EDWIN E. SLICK, OF PITTSBURGH, PENNSYLVANIA

CONTINUOUS GLASS-MELTING POT

Application filed September 2, 1926. Serial No. 133,163.

In manufacturing glass in large quantity production, the glass is usually melted in tanks in which the heating flame plays over the surface of the bath of molten glass. The flame has a destructive effect upon the colors in certain colored glasses, so that they can not be made in tank furnaces. Moreover, the direct contact of the heating flame tends to get dirt and impurities into the glass and tends to deteriorate the quality of the glass. For this reason, the highest quality of glass is usually melted in pots where the glass is shielded from direct contact with the flame. The pot production is, however, a batch process, and does not lend itself to as uniformly maintained quality and large production as does a continuous process. In my continuous pot, I have combined the advantages of the continuous process with the advantages of pot melting. I term my melting apparatus a "pot" rather than a "tank," because the glass is shielded from direct contact with the heating flame.

In the drawings which illustrate the preferred embodiment of my invention:

Figure 4 is a view taken partly in vertical section showing the combination of the pot furnace and leer.

Figure 1:
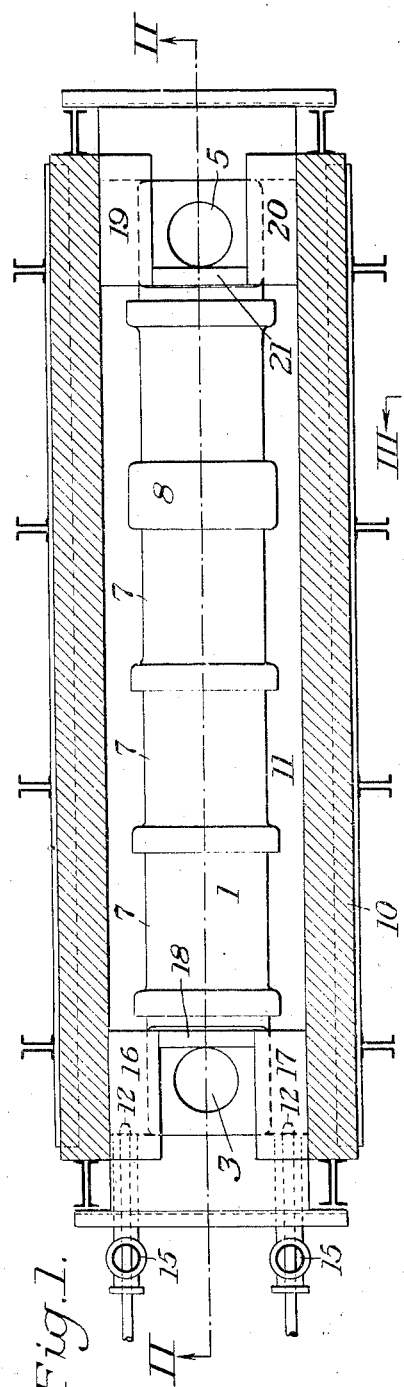
Figure 1 is a view showing the pot in plan and the furnace wall in section.
Figure 2:
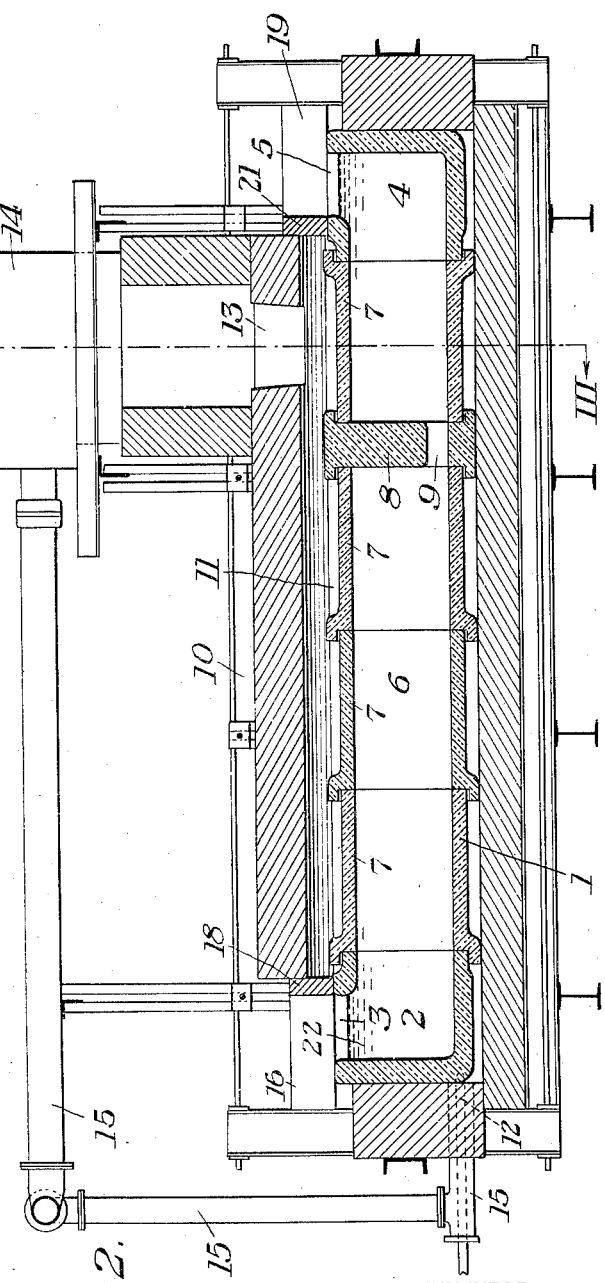
Figure 2 is a vertical section along the line II—II of Figure 1.
Figure 3:
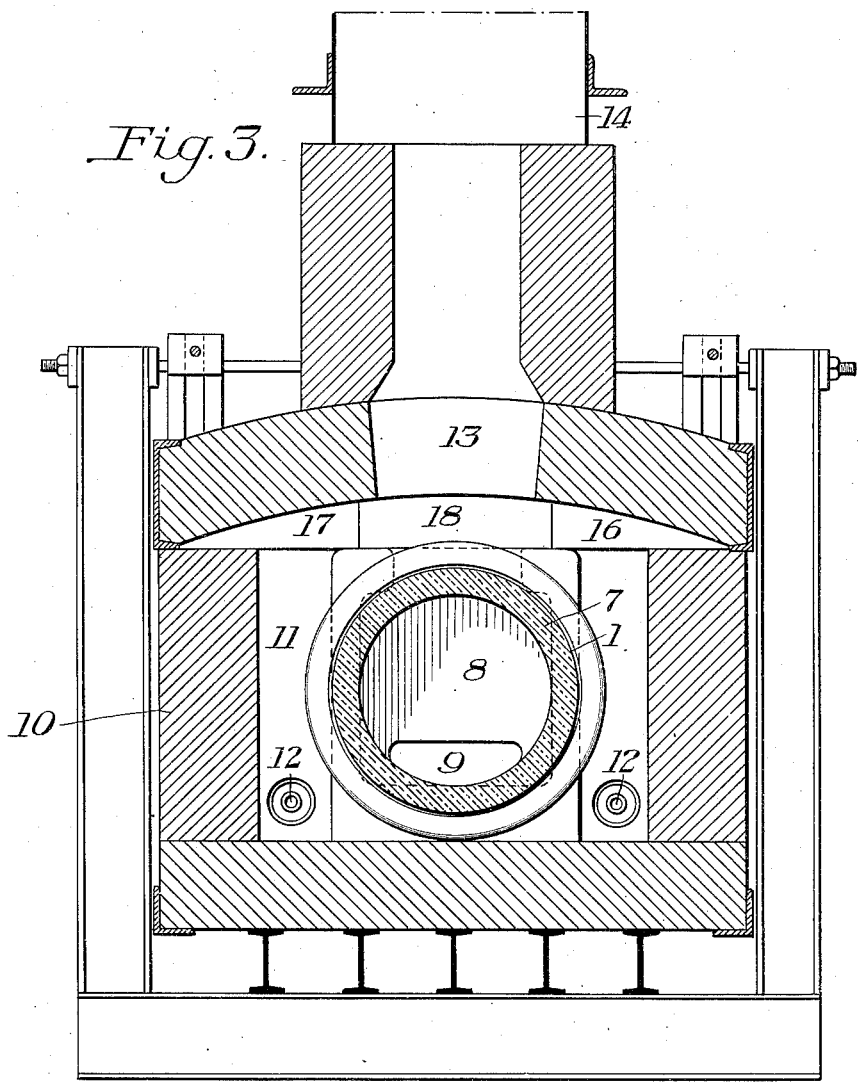
Figure 3 is a vertical section along the line III—III of Figure 2.

Referring to the illustrated embodiment of my invention, the pot is indicated generally by reference numeral 1. The pot has a charging end 2, with a charging opening 3, through which the batch is fed into the pot to be melted; and a working end 4 having a working opening 5, from which the glass is taken by the punty rods of the workmen. The charging and working ends are connected by the tunnel-like chamber 6, forming the body of the pot in which the glass is melted and refined. The body of the pot is preferably formed by a number of sections 7 made of refractory tile. A partition 8 is interposed in the chamber 6 near the working end, having an opening 9 at its bottom, through which the glass flows, in order to insure a thorough mixing of the glass before it passes from the melting to the working end, and prevent any short circuiting currents along the top of the pot.

The pot is enclosed in a heating furnace, indicated generally by reference numeral 10. The heating furnace has a long furnace chamber 11, in which is located the pot 1. The heating chamber 11 surrounds the pot on all sides so that the heating gases get good contact therewith along the bottom and sides as well as on the top of the pot. The heating flame is introduced through gas burners 12 at the melting end of the furnace and flows along the pot 1 through the chamber 11, and is discharged through stack 13 near the working end of the pot. Preheated air is drawn through a recuperator 14, heated by the exhaust gases through pipes 15, and is introduced with the burning gas from the nozzles 12.

Topstones 16, 17, 18, 19, 20 and 21 are used to close the openings between the furnace wall and the pot at the charging and working ends of the pot. The pot is maintained full of the glass bath 22, so that the level of the glass is near the top of the pot, being preferably about the level shown in the drawings. In operating the pot, the batch to be melted is fed into the charging opening 3, and is melted at the melting end of the pot. The molten glass flows from the charging end of the pot along the length of the pot, the flow of glass being such that the glass is refined before reaching the working end. The pot is efficiently heated, since the heating gases have a circulation not only along the top, but also around the sides and bottom of the pot. The glass in the pot is shielded from direct contact with the flame or heating gases so that the pot may be used for the production of colored glass which would be discolored by direct contact with the flames, or the production of any high class glass which requires pot melting, as distinguished from tank melting.

The exhaust heating gases from the furnace 10 may be employed for heating a glass-annealing leer, indicated generally in Figure 4 by reference numeral 23. As shown in Figure 4, the stack 13 of the furnace 10 is connected through the pipe 24 to the leer 23, in which the exhaust heat is utilized for the annealing of glass articles. The reduced heat available in the exhaust gases from the pot furnace is sufficient for the annealing purposes in the leer.

While I have specifically illustrated and described the preferred embodiment of my invention, it is to be understood that the invention is not limited to its illustrated embodiment, but may be otherwise embodied within the scope of the following claims.

I claim:

1. A continuous glass-melting pot having a closed melting and refining chamber formed of a plurality of sections through which the glass is adapted to flow out of contact with heating gases.

2. A continuous glass-melting pot having a closed melting and refining chamber formed of end sections having openings in the top thereof and a plurality of intermediate sections.

3. A continuous glass-melting pot having end sections with charging and working openings therein, connected by a plurality of intermediate sections forming a closed tunnel-like melting and refining chamber.

4. A continuous glass-melting pot having end sections with charging and working openings therein and a closed tunnel-like melting and refining chamber formed of a plurality of sections connecting them, and a heating furnace having a heating space surrounding the melting and refining chamber.

5. A continuous glass-melting pot having end sections with charging and working openings therein and a tunnel-like melting and refining chamber formed of a plurality of sections connecting them, and a partition having a restricted opening near its bottom interposed in said chamber between two of the sections.

6. A pot furnace for melting glass having a long combustion chamber, a relatively long melting pot within the furnace, means for delivering fuel at one end of the furnace, and an offtake flue at the other end of the furnace, the arrangement being such that the products of combustion pass along the melting pot from one end toward the other.

7. A pot furnace for melting glass having a long relatively narrow combustion chamber, a long relatively narrow melting pot within the combustion chamber having upwardly and outwardly opening charging and working openings, a gaseous fuel burner opening into one end of the furnace, and an offtake flue near the other end of the furnace and between the charging and working openings, the arrangement being such that the products of combustion pass from the burner over the length of the melting pot from the burner to the offtake flue.

8. A continuous glass melting pot adapted to be inserted into a combustion chamber, formed of a plurality of intermediate sections and two end sections, the end sections having upwardly extending openings, and a partition having a restricted opening near its bottom interposed between two of the sections.

In testimony whereof I have hereunto set my hand.

EDWIN E. SLICK.